No. 808,922. PATENTED JAN. 2, 1906.
A. T. HERRICK.
PIPE COUPLING.
APPLICATION FILED SEPT. 15, 1904.
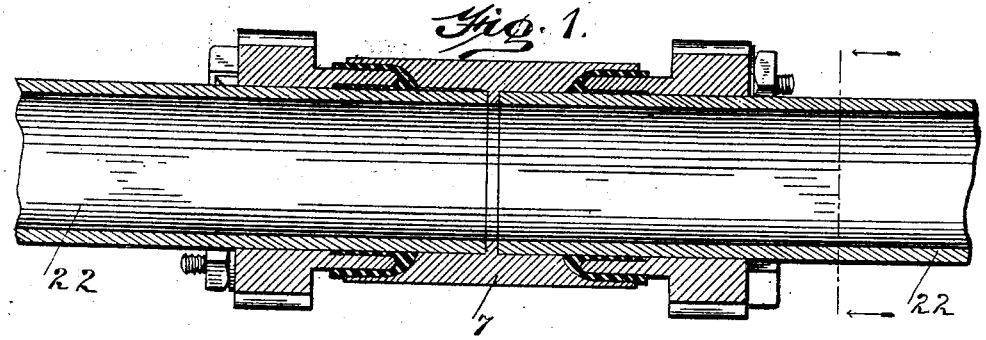
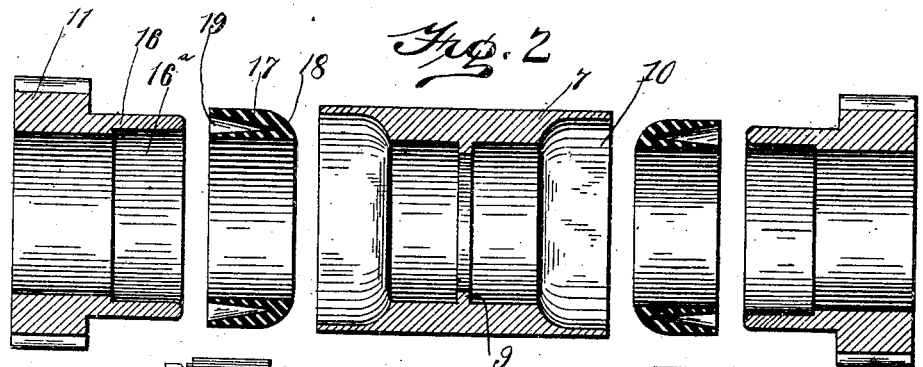
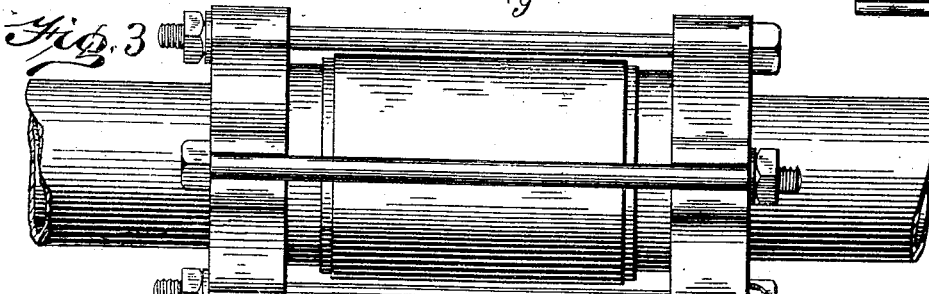
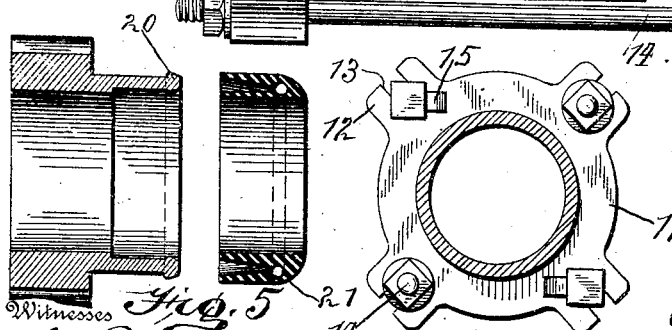
Inventor
Austin T. Herrick
by Knight Bros
Attorneys
Witnesses

UNITED STATES PATENT OFFICE.

AUSTIN T. HERRICK, OF BRADFORD, PENNSYLVANIA.

PIPE-COUPLING.

No. 808,922.

Specification of Letters Patent.

Patented Jan. 2, 1906.

Application filed September 15, 1904. Serial No. 224,521.

*To all whom it may concern:*

Be it known that I, AUSTIN T. HERRICK, a citizen of the United States, residing at Bradford, in the county of McKean, State of Pennsylvania, have invented certain new and useful Improvements in Pipe-Couplings, of which the following is a specification.

My invention relates to that class of pipe-couplings wherein a sleeve is used in which the ends of abutting pipes fit with interposed packing to prevent the leakage of gas or liquid therefrom.

The object of my invention is to provide a simple but effective coupling of this character; and with this and minor objects in view my invention consists of the parts and combination of parts as will be hereinafter more fully described.

In the drawings, Figure 1 is a longitudinal section through the pipe-coupling embodying my invention. Fig. 2 is a similar sectional view of the same parts segregated. Fig. 3 is an elevation of the pipe-coupling. Fig. 4 is an end view of the coupling with the pipe in section. Fig. 5 is a longitudinal section of a slightly-modified form.

7 represents the coupling-sleeve, having a smooth central bore 8, divided by the annular lug 9. The outer ends of the sleeve are provided with enlarged recesses 10, communicating with the central bore 8. While the bottom or inner end of the recesses 10 is shown as rounded, it will of course be understood that it may be square; but for purposes of illustration I have selected the rounded end.

11 represents adjustable collars provided with four pairs of lugs 12, positioned diametrically opposite each other, thus forming a bolt-space 13 between them in which a bolt 14 is adapted to rest, the head of the bolt being prevented from turning by reason of the lug 15, cast integral with the outer face of the collar, as clearly shown in Fig. 4. It is obvious that instead of the pairs of lugs I may have a solid lug and form therein a bolt-opening; but the preferred construction is as shown in the drawings.

16 is an annular flange projecting laterally from the collar and having its inner and outer walls parallel, the bore 16ª of the flange being of slightly-larger diameter than the bore of the collar and having a shoulder against which the packing, to be hereinafter described, abuts, thereby preventing the packing entering between the pipe and the main bore of the collar, which bore is the same in diameter as the main bore of the sleeve 7, so that it will fit snugly around the pipe.

The packing comprises a ring 17, the circular opening of which is slightly less in diameter than the diameter of the bore in the collar 11, the lower corners of the ring being rounded, as at 18, to correspond with the rounded shoulders of the enlarged ends 10 of the sleeve 7. In this connection it is to be stated that these lower corners may be square, if desired. The ring 17 is molded of rubber, cork, or any other similar material suitable for packing and is provided with an annular wedge-shaped groove 19, which extends nearly to the bottom of the ring, as will be clearly seen in Fig. 2. It will be noticed that the outer and inner walls of the ring are vertical and parallel with each other, with the exception of that portion of the outer wall which is rounded at 18.

In Fig. 5 I have shown a slight modification, which consists of forming a bead 20 on the end of the annular flange of the collar and by forming an enlargement or circular space 21 at the bottom of the groove in the packing-ring which is adapted for reception of the bead 20. In Fig. 6 the annular flange is illustrated as wedge-shaped. Either of these constructions may be used with equal result.

In assembling the parts the ends of the pipes 22 are slid in the sleeve 7 until their ends strike against the annular lug 9 in the center of the sleeve. The packing-rings being placed over the pipes before said pipes are inserted in the sleeve are now slid along the pipe until they are seated in the enlarged ends 10 of the sleeve. The collars 11 are now slid along the pipes until the flanges enter the annular groove 10 in the rubber packing-ring 17, whereupon the bolts 14 are placed in the space between the pairs of lugs 12 on each collar. Upon turning the nuts on the bolts the collars are drawn toward each other, thereby forcing the flanges 16 into the annular grooves of the collars until the outer and inner walls of the rings, respectively, are firmly pressed and packed between the flange and the sleeve and the flange and the outer face of the pipe, as clearly shown in Fig. 1. The degree of density to which the packing-rings must be compressed is determined by the party making the joint.

As will be seen in the drawings, the packing-ring is virtually a body comprising two rings united at their bottom edges by means of a solid body, which construction enables me to secure an extended adhesive surface between the pipe, the sleeve, and the annular flange with the packing, thus materially strengthening the joint, which in practice has been found to stand pressure of twelve thousand pounds.

Either construction of flange has to a certain extent a wedging action upon the elastic packing-collar 10.

The annular flange extending from the collar is provided with an enlarged diameter $16^a$ to provide space for packing between said flange and the pipe.

I have not claimed herein the combination of the sleeve having an intermediate diameter fitting the abutting ends of the pipes and larger tapered bores at its ends, pairs of washers introduced in said larger bores, and expanding-wedges entering between the washers of each pair and forcing said washers, respectively, against the inner surface of the sleeve and the outer surface of the pipe, as this forms the subject-matter of my Patent No. 781,774, filed March 2, 1904.

Having described the invention, what is claimed is—

1. In a pipe-coupling, the combination of the sleeve and the collar, each having a bore to fit the outer circumference of a pipe, one of said parts being provided with a packing-receiving bore, and a packing fitting in said bore and provided with a V-shaped annular groove; the other part being provided with an annular projection, the outer end of which is larger than the base of the groove in the packing to cause an extreme compression on the inner and outer faces of the packing adjacent the base of the groove.

2. The combination with the sleeve and the collar, each having a bore fitting the outer circumference of the pipe, one of said parts having an enlarged packing-receiving bore, of a packing for said bore, having a V-shaped groove; the other of said parts having an annular projection with parallel inner and outer walls and its edge wider than the base of the V-shaped groove.

3. In a pipe-coupling, a packing-ring provided with a V-shaped groove extending from the top to a point near the bottom and having an enlargement at the bottom.

4. In a pipe-coupling, the combination with the sleeve having an enlarged bore; of a packing-ring adapted for insertion in said enlarged bore and provided with an annular V-shaped groove having an enlargement at its bottom; and a collar provided with an annular flange having an annular enlargement, and adapted to enter the annular groove of the packing-ring.

The foregoing specification signed this 10th day of September, 1904.

AUSTIN T. HERRICK.

In presence of—
   EDWIN S. CLARKSON,
   M. B. HAYES.